Figure 1:
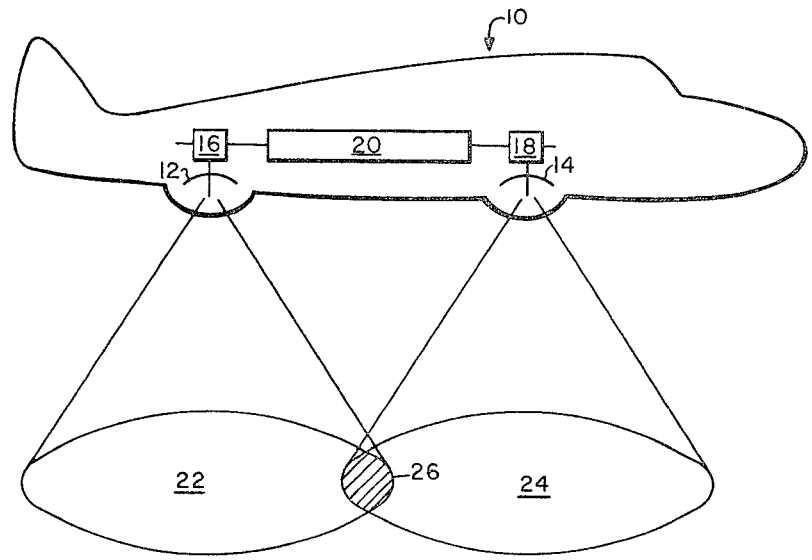

Jan. 16, 1968 D. M. CHIARELLO 3,364,485

RADIOMETRIC ALTITUDE MEASURING APPARATUS

Filed Nov. 1, 1966

INVENTOR.
DAVID M. CHIARELLO

BY *Karl A. Ohralik*

ATTORNEY 3,364,485
RADIOMETRIC ALTITUDE MEASURING
APPARATUS
David M. Chiarello, Emerson, N.J., assignor to General
Precision Systems Inc., a corporation of Delaware
Filed Nov. 1, 1966, Ser. No. 591,162
8 Claims. (Cl. 343—112)

This invention relates to navigation and more particularly to the determination of altitude of an object above a heterogeneous surface.

The determination of the altitude of a craft over a surface such as the earth's surface is essential for navigation purposes, obstacle avoidance, and for numerous other reasons. In accordance with the prior art, altitude determinations are made principally by barometric altimeters and by radar altimeters. Barometric altimeters provide a measurement of altitude above some datum such as sea level rather than above the terrain over which craft may be and are unreliable to the extent that atmospheric variations from the time of an initial setting of the barometer may occur. The barometric altimeter is not compatible with other craft instruments in the sense that the same equipment may be utilized for multiple purposes, such as velocity indicators, so that each may be incorporated as a part of the same entity. Radar altimeters effectively provide accurate determinations of altitude above the terrain but are subject to detection by reason of emitted electromagnetic signals and, furthermore, in determining of velocity of a craft, in a radar system a separate Doppler measurement unit or similar apparatus is required.

Accordingly, it is an object of this invention to facilitate the determination of altitude of a craft above a terrain without relying upon atmospheric conditions and independent of changes thereof.

It is another object of this invention to facilitate the determination of altitude of a craft above a terrain without the radiation of electromagnetic wave energy.

It is another object of this invention to facilitate the determination of altitude of a craft above a terrain by means compatible with other navigation equipment such as velocity determining devices.

The present invention utilizes radiometry, which is the science of detection and measurement of radiant energy. All bodies above absolute zero radiate electromagnetic energy. A body that is a good absorber of radiated energy is a good emitter and a poor reflector. Also, a good reflector of radiated energy is a poor absorber and a poor emitter. The best emitter will be that surface which is the best absorber and any surface which absorbs all the energy striking it will be the best emitter possible. Such a surface would reflect no energy and is known as a black body.

A black body radiates at all wavelengths and the intensity of such radiation varies as a function of wavelength in accordance with Planck's law. Also, at any given wavelength, a body radiates more energy as its temperature is increased. However, in the case of objects other than black bodies, the physical temperature and radiometric temperature may vary appreciably, that is, the amount or intensity of radiation emitted from different objects at the same physical temperature may vary appreciably.

The distinction between radiometric and physical temperature or, in other words, the difference in emissivity of different materials at the same physical temperature, is useful in detecting certain objects even when their physical temperatures are the same as the temperature of surrounding, different objects. For instance, a metallic object has a much colder radiometric temperature (poorer emitter) than common earth terrain background even when its physical temperature is equivalent to or higher than that of the background. In a practical application, an object such as a motor vehicle could be distinguished from surrounding earth terrain. Similarly, for purposes of navigation differences in terrain such as trees, rocks, plowed land and other distinct forms may be detected.

In accordance with this invention, the altitude of a craft, such as an airplane, above a terrain, such as the earth, is determined by the provision of a pair of radiometric receivers with antennas disposed at spaced points on an aircraft and which preferably are in a horizontal line in straight and level flight of the aircraft so as to facilitate detection of overlapping patterns or areas on the terrain. The radiometric receivers are directional having relatively narrow, conical receiving patterns, sometimes called pencil beams, and are preferably directed downwardly perpendicular to the baseline between the antennas. Thus, each is capable of receiving radiation from a circular area on the terrain, assuming that the terrain is substantially flat. Depending upon the beam width of the antenna and the altitude of the craft above the terrain, the patterns or areas from which radiation is received can be made to be overlapping. The extent of the overlap is determined in a correlating device which receives the output from both receivers coupled to the respective antennas. A maximum extent of correlation between the two signals may be determined by detecting portions of the terrain in the manner described and maximizing the correlation function by finding an optimum value of time delay, T, between signals. The extent of correlation at $T=0$ as a proportion of such a maximum may be used as a measure of proportion of overlap in area. It is clear, therefore, that the altitude of the craft above the terrain is a function of the correlation achieved by the respective antennas and receiver and, thus, a determination of the altitude can be made.

The present invention is particularly adapted to be cooperative with and form an integral part of a system employing the velocity determining means and system disclosed and claimed in the patent application of Adolph Gluck for Microwave Radiometric Navigation System, Ser. No. 591,228, filed concurrently herewith and assigned to the present assignee. In the navigation system of the Gluck application, a determination of velocity of a craft is dependent upon a prior determination of the altitude of the craft above the terrain. Thus, a determination of the altitude, in accordance with the present invention, and utilizing the knowledge of such altitude in the velocity determination in accordance with the invention of the mentioned Gluck application, provides a compatible system minimizing the duplication of parts.

In many instances it has been observed that stronger and more discernible radiation patterns are derived by radiometric antennas directed at angles other than 90° to the terrain from which the radiometric emissions are emitted. Accordingly, provision is made also for tilting the antennas on the craft at angles other than perpendicular to a flat surface beneath the aircraft. As still another alternative, the altitude range of operation may be extended by providing for tilting of one or both of the antennas to establish convergent or divergent beams. In this manner, overlapping images can be received by antennas which would be too low to do so if the beams were parallel or, in the case of the upper limit, the images may be made to be of lesser percentage overlap to provide a greater differential in correlation with change in altitude.

Figure 2:
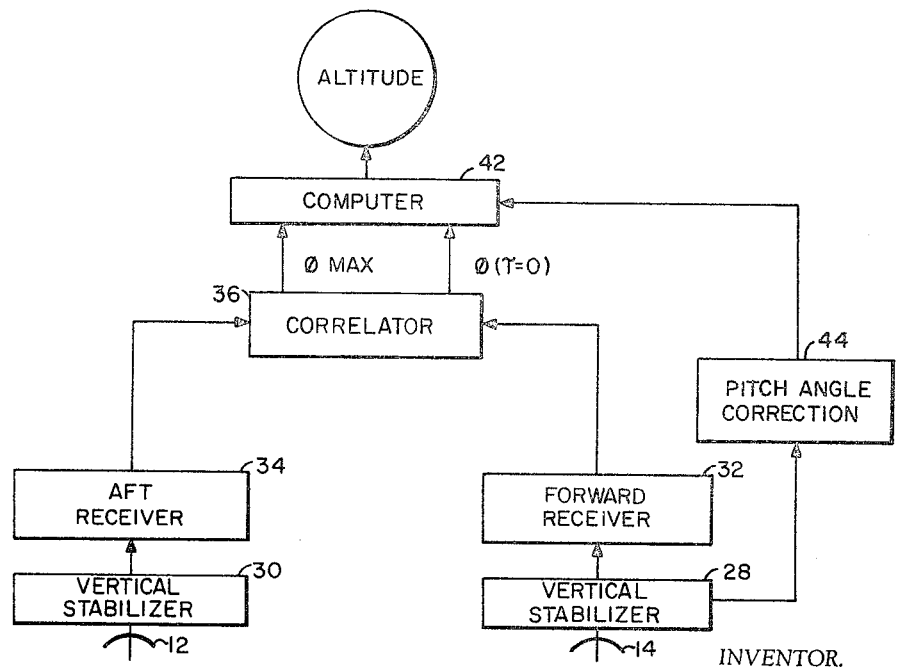

Other and further objects and advantages of this invention will become apparent from the following detailed description thereof taken with the accompanying drawings in which:

FIGURE 1 illustrates generally a typical environment and the manner in which the present invention may be employed, and FIGURE 2 is a functional block diagram illustrating details of the system of this invention.

Referring now to the drawings for a more detailed description of the invention, in FIGURE 1, 10 represents an aircraft in which the present invention may be employed and includes a pair of spaced radiometric antennas 12 and 14 coupled to respective receiving units 16 and 18, which in turn provide output signals to a correlating and computing apparatus 20. The antennas 12 and 14 are spaced apart along the fuselage of the aircraft and are so disposed that in straight and level flight of the aircraft 10, these antennas are in a horizontal line, substantially equi-distant from the surface of the earth. The antennas 12 and 14 are directed so as to be able to receive a cone of radiation from an image on the surface of the earth and the extent of directivity of these antennas is selected so as to be operable within predetermined ranges of altitude above the surface of the earth. Such range of operability requires that the antennas within this range have overlapping images as shown at 22 and 24 with an overlapping image surface 26. It is clear that at altitudes below a predetermined minimum wherein the images no longer overlap the system becomes non-functional, and that at altitudes above some predetermined maximum the increase in overlapping area 26 with increasing altitude becomes negligible, at which point the system reaches a limit. The system, as shown in FIGURE 1, thus is functional to measure the extent of overlap of the images received and to measure such overlapping area to determine the altitude of the craft above the surface of the earth.

The manner in which the system shown in FIGURE 1 is operative may be explained by reference to FIGURE 2 of the drawings showing the system in greater detail. In FIGURE 2, the antennas 12 and 14 are shown as being mounted and controlled in orientation by respective stabilizer units 28 and 30. In a typical operation of the system, the antennas 12 and 14 are directed so as to receive substantially parallel beams of radiation from the surface of the earth or, in other words, when the craft 10 is flying over flat terrain, the beams received by these respective antennas are substantially perpendicular to the earth's surface. The range of the system is extended by provision for tilting one or both of the antennas so as to receive either convergent or divergent beams. In cases wherein the craft is so low that the parallel beams do not overlap, the antennas are tiltable toward each other so as to receive divergent beams of radiation and which are overlapping. Alternatively, at great heights wherein the extent of overlap by parallel beams is a high percentage of either image area, the antennas may be tilted away from each other so as to receive convergent beams, thus, reducing the percentage of image area overlap and facilitating a measure of change in overlap with change in altitude. The signals received by respective antennas 12 and 14 are applied to receivers 32 and 34, the receiver 32 being the forward receiver and the receiver 34 being the aft receiver on the aircraft. The receivers 32 and 34 may be of any suitable type, such as superheterodyne or tuned radio frequency receivers for broader band operation, and the outputs of these respective receivers are applied to a correlator unit 36, which may be of any one of a number of known types utilizing analog or, more likely, digital correlation principles. From the output of the correlator, the percentage or fraction of total correlation may be calculated in a computer 38.

The correlator unit 36 will have two modes of operation. First it will compute the correlation function $\phi$ ($T=0$) for the two signals with zero time delay between them. If the beams do not overlap, there will be no correlation. As the overlap increases (because altitude increases) the correlation function will also increase. Secondly, the correlator will maximize the correlation function by finding an optimum time delay $T'$, therefore, $\phi$ max.$=\phi(T=T')$. In this case, both signals will represent the same ground image seen at different times. These correlation values $\phi(T=0)$ and $\phi(T=T')$ are stored in computer 38. By comparing the correlation function at $T=0$ with the maximum value at $T=T'$, the extent of correlation and, hence, the amount of image overlap can be determined.

Calculations of altitude of craft 10 above the earth's surface requires, as an additional factor, the horizontal spacing between antennas 12 and 14 and, thus, in situations wherein the aircraft 10 is not in straight and level flight or, in other words, at a pitch angle, correction must be made and a pitch angle correction unit 44 is provided which derives a signal from vertical stabilizer unit 28 producing an indication of the pitch angle. The output of the pitch angle correction unit 44 is applied as another input to computer 42. The computer 42, with data indicating the extent of correlation as a fraction of total correlation and the pitch angle of the aircraft, is effective to compute and determine the height of the aircraft above the surface of the earth.

In the operation of the system, according to this invention, the aircraft 10 is in flight above the earth's surface and the radiometric receivers with antennas 12 and 14 receive radiometric signals from overlapping patterns on the surface of the earth, as shown in FIGURE 1 of the drawing. The extent of correlation of the images received, which is a function of the overlapping surface area 26, is ascertained by the correlator apparatus 36, due consideration being given to the pitch angle as determined by the pitch angle correction unit 44.

As a final step in the determination of the altitude, the maximum correlation between images received and the correlation of images at $T=0$ are compared, yielding an extent of overlap of the images 22 and 24, thus, yielding an indication of altitude as determined by the computer 42. For this purpose, the computer 42 need be programmed with the relationship between percent area overlap and altitude.

While the present invention has been described in a preferred embodiment, it will be obvious to those skilled in the art that various modifications can be made therein within the scope of the invention, and it is intended that the appended claims cover all such modifications.

What is claimed is:
1. A method of determining the altitude of a craft above the surface of earth comprising the steps of detecting the radiation emitted from a first predetermined area on the earth by a first directional antenna on said craft and detecting the radiation emitted from a second predetermined area on the earth and including as a part thereof a portion of the first predetermined area by a second directional antenna on said craft horizontally spaced from said first antenna, correlating the radiation patterns received by respective antennas to determine the extent of overlap of said areas and calculating the altitude of said craft above the earth as a function of said overlapping area.

2. A method according to claim 1, wherein the areas detected by said antennas are laterally displaced from a projection of the craft upon the earth's surface.

3. A method of determining the altitude of a craft above the surface of the earth comprising the steps of detecting the radiation received from the earth at a pair of spaced locations on said craft, forming signals having characteristics corresponding to the radiation patterns of each location, comparing signals corresponding to simultaneously received radiations by respective antennas from overlapping locations on the earth to produce a first correlation value, comparing signals corresponding to radiations received by respective antennas at different times to determine a time interval producing maximum correlation value between received radiations, and utilizing the first and maximum correlation values to determine the altitude of the craft above the earth.

4. An apparatus for determining the altitude of a craft above a heterogeneous terrain comprising a pair of spaced antennas on said craft and being capable of receiving radiation naturally emitted from said terrain, a pair of receivers coupled, respectively, to said antennas, correlating means coupled to both of said receivers, means for detecting radiating images on said terrain by said antennas, and means including said correlating means for detecting the extent of overlap of said images and for determining the altitude of said craft above said terrain.

5. An apparatus according to claim 3, additionally comprising means for directing said antennas angularly and laterally with respect to said craft for receiving radiation from patterns laterally displaced from a projection of the craft upon the earth's surface.

6. An apparatus according to claim 3, additionally comprising vertical stabilization means for maintaining said antennas oriented to receive substantially parallel radiation beams and further means cooperative with said correlating means for correcting for pitch of said craft shortening the horizontal distance between said antennas.

7. An apparatus according to claim 3, additionally comprising means for selectively directing said antennas to receive convergent or divergent beams of radiation to extend the altitude range of operability of said apparatus.

8. An apparatus according to claim 4 wherein said means for detecting overlap includes means for comparing an image received by one of said antennas with images received by the other of said antennas at different intervals of time to determine a maximum correlation value at reception of substantially identical images, means for determining the correlation of images received without time delay, means for comparing the correlation value at maximum correlation with the correlation value without time delay.

No references cited.

RODNEY D. BENNETT, *Primary Examiner.*

R. E. BERGER, *Assistant Examiner*